Patented Nov. 17, 1942

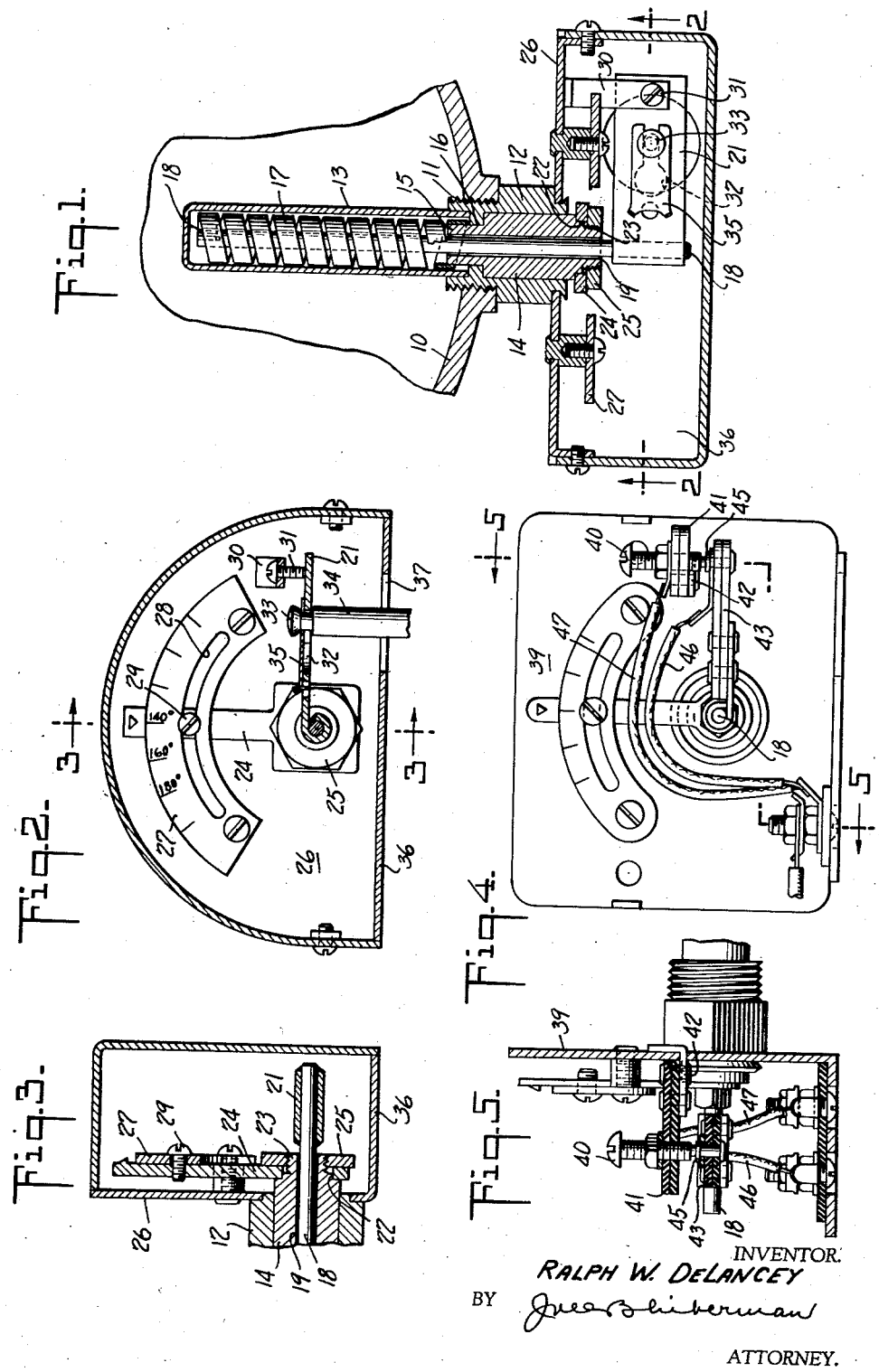

2,302,108

UNITED STATES PATENT OFFICE 2,302,108

TEMPERATURE RESPONSIVE DEVICE

Ralph W. De Lancey, Meriden, Conn., assignor to The Miller Company, Meriden, Conn., a corporation of Connecticut Application January 31, 1940, Serial No. 316,566

3 Claims. (Cl. 200—139)

The present invention relates to temperature responsive devices, and is more particularly directed toward aquastats suitable for use in controlling the operation of oil burners either through electrical or mechanical means.

The present invention contemplates a device which may be easily constructed, assembled and adjusted, and one designed to obtain sufficient power for effecting direct mechanical operation of devices, such as valves for feeding oil to an oil burner. It also contemplates a form of a thermally responsive device adapted for control of an electric circuit, wherein many of the same parts may be used.

The accompanying drawing shows, for purposes of illustrating the present invention, two of the many embodiments in which the invention may take form, it being understood that the drawing is illustrative of the invention rather than limiting the same.

In the drawing:

Figure 1 is a central sectional view through an aquastat designed for mechanically operating a valve or the like;

Figure 2 is a section on the line 2—2 of Figure 1;

Figure 3 is a transverse sectional view on the line 3—3 of Figure 2;

Figure 4 is a view similar to Figure 2 showing a circuit controlling aquastat; and Figure 5 is a sectional view on the line 5—5 of Figure 4.

The wall of a boiler, water heater, or the like is indicated at 10. It is threaded to receive the threaded end 11 of a nut or stud 12 which acts as a fixed support and body for the temperature responsive device.

The nut is tubular as indicated and the inner or upper end, as shown in Figure 1, receives a tube 13 which is preferably secured to it by soldering or brazing. The other end of the nut 12 rotatably receives a bushing 14. The bushing has a reduced end 15 which passes through the small diameter portion 16 of the nut 12 so as to align the parts. The reduced end of the bushing carries a coiled bimetallic thermostat 17 which extends through the tube 13. The other end of the thermostat is secured to a rod 18 which extends through an axial opening 19 in the bushing 14. The end of the tube 13 is closed to protect the thermostat.

The front or exposed end of the rod 18 carries an arm 21 which is preferably welded to the rod. The end of the bushing is reduced, as indicated at 22, and threaded, as indicated at 23. The reduced end of the bushing receives an arm 24, while the threads receive a lock nut 25.

The stud or nut 12 is fixedly secured to a plate 26. This plate carries a sector plate 27 disposed in front of the arm 24 and slotted at 28 to receive a clamping screw 29 carried by the arm 24.

As shown in Figures 1 to 3 the plate 26 also carries a bracket 30 with an adjustable stop screw 31 opposite the end of the lever 21. As shown in these figures the arm 21 is provided with a keyhole opening 32 to receive the headed end 33 of a rod 34. The head of the rod is locked in place by a spring clip indicated at 35. This rod may extend down through a hole 37 in the bottom flange 36 of plate 26 and be coupled with a valve stem which holds an oil passage open when the rod is in the upper position and closes it when the rod is lowered.

In adjusting the mechanism, the arm 21 is brought against the stop 31, the arm 24 secured opposite the marking on the sector (for example, 140°), the device brought to that temperature and then the nut 23 is tightened to lock the bushing 14 and arm 24 together. This fixes the position of the shaft and establishes a 90° relation between the arms 24 and 21. When the aquastat is at a lower temperature than 140° the arm 21 is held against the stop and the valve is open. As soon as the 140° temperature is reached the arm 21 turns clockwise and the valve is closed. If the arm 24 is released and shifted to the left a higher temperature will be required to move the arm 21 away from the stop 31. This stop may be adjusted somewhat for closer control and to compensate for the twisting of the coil due to the load supported by it.

In the arrangement of Figures 4 and 5, the plate 39 corresponding with plate 26 of Figures 1–3, supports a contact screw 40 by means of an insulator 41 fastened to bracket 42. The thermostatically operated rod 18 operates an insulated arm 43 which carries a contact 45 opposite the end of screw 40. The contact 45 and screw 40 are connected by wires 46 and 47 with binding posts 48 and 49 carried on an insulator 50 secured to the bottom flange 51 of the plate. The thermostat will control the opening and closing of the circuit in an obvious manner. As many of the same parts are used, manufacturing costs are correspondingly reduced.

It is obvious that the invention may be embodied in many forms and constructions within the scope of the claims and I wish it to be understood that the particular forms shown are but two of the many forms. Various modifications and changes being possible, I do not otherwise limit myself in any way with respect thereto.

What is claimed is:

1. In a temperature responsive device, a coiled bimetallic thermostat, a normally fixed bushing secured to one end of the thermostat, a rod disposed axially of the bushing and secured to the other end of the thermostat to be turned by the thermostat with change of temperature, the rod passing through the bushing and carrying an arm at the free end thereof, a stop against which the arm is held when the thermostat is below a predetermined temperature, a bushing support in which the bushing is mounted for angular adjustment, a bushing adjusting arm adjustably secured to the bushing, a plate fixedly secured to the bushing support, a sector carried by the plate, and means to secure the second arm to the sector in selected fixed positions so that the first arm will move away from the stop when the predetermined temperature is exceeded.

2. In a temperature responsive device, a coiled bimetallic thermostat, a normally fixed bushing secured to one end of the thermostat, a rod disposed axially of the bushing and secured to the other end of the thermostat to be turned by the thermostat with change of temperature, the rod passing through the bushing and carrying an arm at the free end thereof, a stop against which the arm is held when the thermostat is below a predetermined temperature, a bushing support in which the bushing is mounted for angular adjustment, a fixed sector, an arm carried by the bushing and adjustable about the sector, means to secure the second arm and bushing together so that the arm may be used to adjust the bushing and through the thermostat to adjust the first arm to the desired position when at a desired temperature, and means to secure the second arm to the sector so that temperature at which the first arm is brought to the operating position may be preselected.

3. In a temperature responsive device, a supporting plate, a coiled bimetallic thermostat extending rearwardly from the plate, a rod secured to one end of the thermostat and extending forwardly of the plate, an arm carried by the front end of the rod, a forwardly extending stop limiting angular movement of the arm in one direction, a bushing through which the rod extends and to which the other end of the thermostat is secured, a second arm fixedly secured to the bushing to have a predetermined angular position relative to the first arm at a known temperature and when the thermostat is free of tension, whereby when the second arm and bushing are angularly shifted in position the thermostat will move the rod carried arm away from the stop at a corresponding temperature, and a clamping plate in front of the supporting plate and means for securing the second arm to the clamping plate.

RALPH W. DE LANCEY.